Patented June 25, 1929.

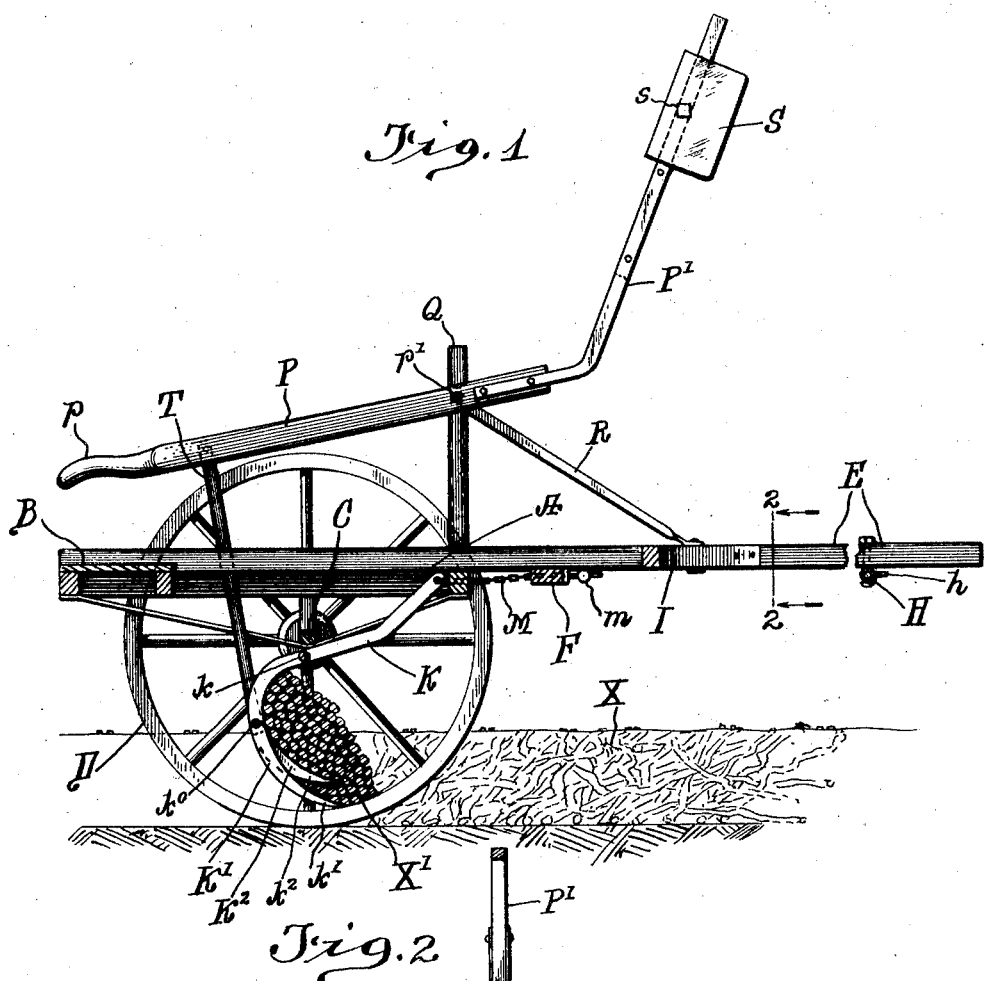

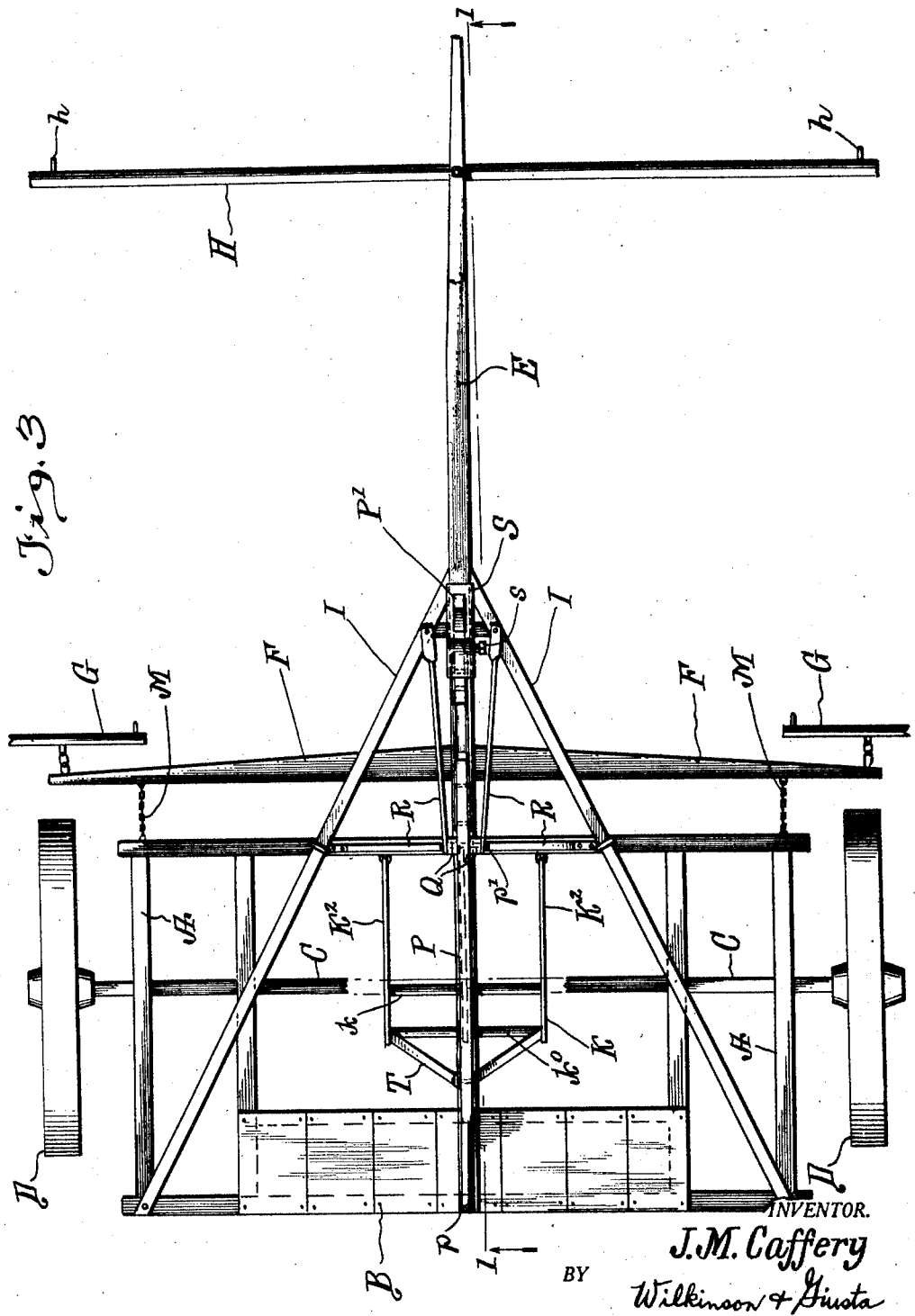

1,718,852

UNITED STATES PATENT OFFICE.

JOHN M. CAFFERY, OF FRANKLIN, LOUISIANA.

CANE-PILING MACHINE.

Application filed July 6, 1928. Serial No. 290,831.

My present invention relates to improvements in machines for use in harvesting cane in the field. In the practice, which has prevailed for many years past, it is the custom to top the stalks while standing with cane knives, and then to cut the individual stalks near the surface of the ground, and to pile the stalks in heap rows.

Cane is usually cultivated in rows like corn, and the cut stalks in two or more rows are thrown by hand in a heap row, where they form an irregular tangled layer substantially at right angles to the longitudinal axis of the trough between two rows, in which they are piled.

The object of my present invention is to gather the stalks, thrown more or less carelessly in an irregular stratum, into piles, which may be large or small as desired, and may be of such size either to be hoisted by derricks into carts, wagons, or other vehicles, or may be gathered up by hand, and thrown into the carts by the loaders.

In the gathering up of the bundles of cane stalks just described, there is an incidental general straightening out of the stalks causing them to approximate bundles of fagots, which may be caught up with a cane grab, or readily bound with slings, or may be readily gripped in the hands and arms of the loader, as will be hereinafter more fully described.

My invention will be more fully understood after reference to the accompanying drawings, in which like parts are indicated by similar reference symbols throughout the several views, and in which, Figure 1 is a side elevation of the machine, partly in section, along the line 1—1 of Figure 3, and looking in the direction of the arrows.

Figure 2 is a front view of the same, parts being broken away, and parts in section along the line 2—2 of Figure 1, and, Figure 3 is a plan view.

A represents the frame work of the implement, which may be of any desired or preferred construction, which is shown as built up of timber or scantlings, such as could be conveniently manufactured under local conditions.

This frame work carries a suitable driver's platform B, on which the driver stands. Obviously a driver's seat may be provided, if desired.

This platform B is supported on the axle C, on which the wheels D are journalled. This axle should be wide enough, so that the wheels will span two rows, or approximately fourteen feet, more or less, as shown in Figure 2.

Attached to the end of the platform is the tongue E, to which the cross beam F is pivoted, to which cross beam the single trees G are attached. The forward end of the tongue may preferably be provided with a breast pole H, having hooks, eyes, or the like $h$, so that the collar, or bridle, of the draft animal may be so connected to this breast pole H that the animal will be held at the proper distance from the tongue E, and thus the animal will be caused to follow the bed between two rows in front of the wheel. The tongue E is rigidly connected to the frame A, in any convenient way, as by means of the diagonal braces I.

Pivoted beneath the wheel body, as at $k$, is the rake K, which is composed of three or more hook-shaped arms, the center one K′, having its hooked end $k'$ project lower than the hooked end $k^2$ of the side hooks $K^2$, so that this center hook of the rake will project down further into the furrow between the rows, as shown in Figures 1 and 2.

This hook is held against turning too far backward by the chain M secured to the wheel body. In order to regulate the depth to which the rake teeth engage, the length of this chain may be adjusted in any convenient way, as by the device indicated diagrammatically at $m$ in Figure 1.

This rake is thrown into or out of operation, after the manner of a hay rake, by a device, which will now be described.

P represents a hand lever, having the handle $p$ within easy reach of the driver mounted on the platform B, which lever is pivoted, as at $p'$, to the uprights Q, which uprights may be braced in any convenient way, as at R. This lever P carries a weighted arm P′, preferably bent at an angle upward, as shown in Figure 1. This weighted arm may be made of sufficient weight of itself to counterbalance the weight of the rake and its load, or it may be provided with a sliding weight S adjustably connected to said arm P′, as by means of a set screw $s$.

Pivotally attached to the lever P near the handle is the lifting rod or link T, which is connected to the cross piece $k^0$ of the rake K, as shown most clearly in Figure 1.

Thus by pressing down on the handle $p$, the rake may be forced down against the action of the weighted arm P', while by lifting up on the handle p, the weighted arm will tend to lift the rake with its load.

In operation, the rake is preferably drawn by two mules, or horses, hitched to the single trees G, driven to a position straddling the heap row, as shown in Figure 2.

As the vehicle progresses, the three-pronged rake will gather up, and in a measure straighten out the cane stalks X, until a bundle X' of the desired size is gathered up, as shown in Figure 1; then if the driver raises up on the handle p, this bundle of stalks will be released from the rake, and will form a pile, extending across the furrow between the two rows ready to be lifted by a cane grab operated on a derrick and leaving a convenient space for passing beneath the bundle one or more slings, such as are well known in the art.

If large bundles are desired the bundles may be hoisted by a cane grab operated with derricks or slings may be used for hoisting with derricks, but if small bundles are desired for lifting by hand, by gathering up and straightening out the cane stalks by the rake, as just described, it will leave a clearance space under the bundles for the loaders to grasp the bundles, and throw them into carts, or other vehicles, used in this art.

After the bundle of gathered up stalks has been taken up and the vehicle continues forward, the rake is lowered, and another bundle is gathered by the rake and deposited, and the operation may be repeated indefinitely.

By having the weight S adjustably mounted on the arm P', the counterbalancing effect of said weight may be adjusted, so that the machine may be fitted to gather the cane stalks into large piles, or small ones, according to the adjusted position of the weight.

Thus it will be seen that with the foregoing implement, the tangled mass of cane stalks may be, more or less, straightened out in such a way as to be conveniently handled; and also that the bottom of each bundle, when released, will normally rest clear of the ground, so that considerable saving in manual labor in either adjusting the slings or lifting the bundles is effected.

While I have shown the invention as constructed mainly of wood, which may be conveniently done by the usual partly skilled labor available on sugar plantations, by which the expense of manufacture and transportation may be largely saved, I do not mean to limit the invention to such constructional details, but it will be obvious that various changes might be made in the construction, combination, and arrangement of parts, which could be used without departing from the spirit of my invention, and I do not mean to limit the invention to such details, except as particularly pointed out in the claims.

Having thus described my invention, what I claim and desire to secure by Letters Patent of the United States is:—

1. In a cane piling machine, the combination with a vehicle body provided with a driver's platform, of an axle and wheels supporting said vehicle body, a rake pivoted beneath said vehicle body, said rake having a plurality of hook shaped teeth, the central tooth being longer than the others, an operating lever pivoted above said platform and having its rear end terminating in a handle, said lever being provided with a forwardly disposed upwardly inclined weighted arm, a link connecting said lever adapted to swing said rake up or down about its pivot, and means for checking the backward swing of said rake.

2. In a cane piling machine, the combination with a vehicle body provided with a driver's platform, of an axle and wheels supporting said vehicle body, said axle being of a length to span two cane rows, a rake pivoted beneath said vehicle body substantially midway between said wheels, said rake having a plurality of forwardly projecting hook shaped teeth, the central tooth being longer than the others, an operating lever pivoted above said platform and having its rear end terminating in a handle, said lever being provided with a forwardly disposed upwardly inclined weighted arm, and a link connecting said lever and said rake.

3. In a cane piling machine, the combination with a vehicle body provided with a driver's platform, of an axle and wheels supporting said vehicle body, a tongue rigidly connected to said wheel body, a breast pole pivoted to said tongue, means for attaching draft animals to said vehicle body, a rake pivoted beneath said vehicle body, said rake having a plurality of forwardly projecting hook shaped teeth, the central teeth being longer than the others, an operating lever pivoted above said platform and having its rear end terminating in a handle, said lever being provided with a forwardly disposed upwardly inclined weighted arm, and a link connecting said lever adapted to swing said rake up or down about its pivot.

4. In a cane piling machine, the combination with a vehicle body provided with a driver's platform, of an axle and wheels supporting said vehicle body, a rake pivoted beneath said vehicle body, said rake having a plurality of forwardly projecting hook shaped teeth, the central tooth being longer than the others, an operating lever pivoted above said platform and having its rear end terminating in a handle, said lever being provided with a forwardly disposed arm, a weight slidably mounted on said arm, and a link connecting said lever and said rake.

JOHN M. CAFFERY.